(12) United States Patent
Kim

(10) Patent No.: US 8,180,410 B2
(45) Date of Patent: May 15, 2012

(54) HOUSING AND CLIP ASSEMBLY FOR PORTABLE ELECTRONICS DEVICE

(75) Inventor: Hyekyung Kim, Lathrop, CA (US)

(73) Assignee: Sandisk Technologies Inc., Plano, TX (US)

( * ) Notice: Subject to any disclaimer, the term of this patent is extended or adjusted under 35 U.S.C. 154(b) by 971 days.

(21) Appl. No.: 12/134,664

(22) Filed: Jun. 6, 2008

(65) Prior Publication Data

US 2009/0305752 A1 Dec. 10, 2009

(51) Int. Cl.
*H04M 1/00* (2006.01)
*G09G 3/00* (2006.01)

(52) U.S. Cl. ........................ 455/575.1; 345/32
(58) Field of Classification Search ............ None
See application file for complete search history.

(56) References Cited

U.S. PATENT DOCUMENTS

| | | | |
|---|---|---|---|
| 3,294,222 A | 12/1966 | Hodgson |
| D209,629 S | 12/1967 | Brockway |
| D214,819 S | 7/1969 | Goldberg |
| 3,615,006 A | 10/1971 | Freed |
| 3,749,230 A | 7/1973 | Foster |
| 3,767,110 A | 10/1973 | Congleton |
| D230,569 S | 3/1974 | Fallowfield et al. |
| 3,891,070 A | 6/1975 | Montanari |
| D237,419 S | 10/1975 | Lapins et al. |
| 3,954,179 A | 5/1976 | Warmath |
| 4,083,481 A | 4/1978 | Selinko |
| D249,825 S | 10/1978 | Hasulak |
| 4,345,607 A | 8/1982 | Contreras et al. |
| 4,454,889 A | 6/1984 | Contreras, Sr. |
| D278,097 S | 3/1985 | Akiyoshi |
| D281,033 S | 10/1985 | Mohri |
| D285,177 S | 8/1986 | Goetz |
| D288,983 S | 3/1987 | Juhas et al. |
| 4,703,853 A | 11/1987 | Byrns |
| 4,778,047 A | 10/1988 | Lay |
| 4,828,153 A | 5/1989 | Guzik et al. |
| 4,863,034 A | 9/1989 | Contreras, Sr. |
| D308,913 S | 7/1990 | Kirchner |
| D309,431 S | 7/1990 | Sheehan |

(Continued)

FOREIGN PATENT DOCUMENTS

KR 3004-432600000 3/2007

(Continued)

OTHER PUBLICATIONS

Search Report for Taiwanese Design Patent Application No. 097305780 (Apr. 21, 2009).

(Continued)

*Primary Examiner* — Yuwen Pan
*Assistant Examiner* — Ayodeji Ayotunde
(74) *Attorney, Agent, or Firm* — Jenkins, Wilson, Taylor & Hunt, P.A.

(57) ABSTRACT

The subject matter described herein includes a housing and clip assembly for a portable electronics device. According to one aspect of the subject matter described herein, a housing for a portable electronics device is provided. The housing includes a housing member for holding components of a portable electronics device. The components include a display. The housing further includes a lens coupled to the housing member for allowing viewing of the display. The lens includes a first position at rest and pivots to a second position for controlling a function of the portable electronics device.

12 Claims, 14 Drawing Sheets

U.S. PATENT DOCUMENTS

| | | |
|---|---|---|
| 5,050,623 A | 9/1991 | Yuhara et al. |
| 5,081,709 A | 1/1992 | Benyo et al. |
| 5,094,396 A | 3/1992 | Burke |
| 5,115,931 A | 5/1992 | Dubach |
| D333,727 S | 3/1993 | Schurman |
| 5,201,858 A | 4/1993 | Otrusina |
| 5,274,885 A | 1/1994 | Hellweg |
| 5,293,995 A | 3/1994 | Iwaki et al. |
| D347,728 S | 6/1994 | Taniyama |
| D352,601 S | 11/1994 | Dallaire |
| 5,379,490 A | 1/1995 | Wandt et al. |
| D358,055 S | 5/1995 | Long et al. |
| 5,531,322 A | 7/1996 | Iwaki et al. |
| 5,638,838 A | 6/1997 | Lombardi |
| 5,664,292 A | 9/1997 | Chen |
| 5,697,498 A | 12/1997 | Weisburn et al. |
| D390,357 S | 2/1998 | Rosen |
| D391,760 S | 3/1998 | Zeller |
| 5,727,681 A | 3/1998 | Li |
| 5,740,938 A | 4/1998 | Hofmann et al. |
| 5,749,464 A | 5/1998 | Cheris et al. |
| 5,752,615 A | 5/1998 | Hofmann et al. |
| 5,782,352 A | 7/1998 | Senda |
| D397,870 S | 9/1998 | De Winter |
| 5,806,146 A | 9/1998 | Chen |
| 5,822,690 A * | 10/1998 | Rynk et al. .................. 455/351 |
| 5,826,719 A | 10/1998 | Chen |
| 5,829,102 A | 11/1998 | Conti |
| 5,829,583 A | 11/1998 | VerWeyst et al. |
| 5,842,486 A | 12/1998 | Davis et al. |
| 5,865,310 A | 2/1999 | Lee |
| D406,192 S | 3/1999 | Schurman |
| 5,878,878 A | 3/1999 | Wu |
| 5,884,764 A | 3/1999 | Hartstone |
| 5,906,031 A | 5/1999 | Jensen |
| 5,937,487 A | 8/1999 | Bauer |
| D413,440 S | 9/1999 | Schurman |
| D413,753 S | 9/1999 | Allsop |
| 5,984,441 A | 11/1999 | Stokhuijzen |
| D419,359 S | 1/2000 | Eguchi et al. |
| 6,021,901 A | 2/2000 | Wolfe |
| 6,029,811 A | 2/2000 | Heiligers |
| D425,294 S | 5/2000 | Haverstick |
| 6,122,526 A | 9/2000 | Parulski et al. |
| D431,881 S | 10/2000 | Gavin |
| 6,125,513 A | 10/2000 | Cheraso et al. |
| 6,199,559 B1 | 3/2001 | Nikolaus et al. |
| 6,199,689 B1 | 3/2001 | Higuchi et al. |
| 6,223,754 B1 | 5/2001 | Burdi et al. |
| 6,275,383 B1 | 8/2001 | Bohm |
| 6,283,298 B1 | 9/2001 | Seidler |
| 6,311,881 B1 | 11/2001 | Kamiya |
| D456,201 S | 4/2002 | Hummell et al. |
| 6,443,340 B1 | 9/2002 | Chung et al. |
| D468,199 S | 1/2003 | Lambelet, Jr. et al. |
| D469,109 S | 1/2003 | Andre et al. |
| D470,658 S | 2/2003 | Chunn et al. |
| D472,245 S | 3/2003 | Andre et al. |
| D477,143 S | 7/2003 | Nagata et al. |
| D477,745 S | 7/2003 | Shamoon |
| 6,591,085 B1 | 7/2003 | Grady |
| 6,593,914 B1 | 7/2003 | Nuovo et al. |
| D478,689 S | 8/2003 | Thorpe |
| 6,648,166 B2 | 11/2003 | Levy |
| D484,352 S | 12/2003 | Palmer |
| 6,665,173 B2 * | 12/2003 | Brandenberg et al. ... 361/679.09 |
| D486,813 S | 2/2004 | Chun |
| D489,052 S | 4/2004 | Shiraki et al. |
| 6,739,452 B2 | 5/2004 | Rochelo |
| 6,742,685 B2 | 6/2004 | Williams |
| 6,743,104 B1 | 6/2004 | Ota et al. |
| 6,752,299 B2 | 6/2004 | Shetler et al. |
| 6,766,952 B2 | 7/2004 | Luu |
| D497,074 S | 10/2004 | Dardashti |
| D497,508 S | 10/2004 | Dardashti |
| D497,618 S | 10/2004 | Andre et al. |
| 6,824,006 B2 | 11/2004 | Lambelet, Jr. |
| D506,476 S | 6/2005 | Andre et al. |
| D511,347 S | 11/2005 | Naruki |
| 6,977,675 B2 | 12/2005 | Kotzin |
| D513,512 S | 1/2006 | Tsai |
| D514,308 S | 2/2006 | Wahl et al. |
| D516,576 S | 3/2006 | Ive et al. |
| D521,023 S | 5/2006 | Kim et al. |
| 7,046,230 B2 | 5/2006 | Zadesky et al. |
| D525,069 S | 7/2006 | Farrar et al. |
| D529,044 S | 9/2006 | Andre et al. |
| RE39,311 E | 10/2006 | Davis et al. |
| D531,025 S | 10/2006 | Tanner |
| D532,425 S | 11/2006 | Kim |
| D533,566 S | 12/2006 | Lee |
| D535,308 S | 1/2007 | Andre et al. |
| 7,163,152 B2 | 1/2007 | Osborn et al. |
| D536,691 S | 2/2007 | Park |
| D537,810 S | 3/2007 | Lee |
| D538,779 S | 3/2007 | Nohara |
| D538,820 S | 3/2007 | Andre et al. |
| 7,191,899 B2 | 3/2007 | Garcia et al. |
| D541,297 S | 4/2007 | Andre et al. |
| D541,298 S | 4/2007 | Andre et al. |
| D541,299 S | 4/2007 | Andre et al. |
| D542,306 S | 5/2007 | Andre et al. |
| D542,808 S | 5/2007 | Andre et al. |
| D543,554 S | 5/2007 | Dai |
| D553,640 S | 10/2007 | Kimura et al. |
| 7,281,214 B2 | 10/2007 | Fadell |
| 7,293,647 B2 | 11/2007 | Wong et al. |
| 7,306,159 B1 | 12/2007 | Rochelo |
| D558,793 S | 1/2008 | Honda |
| D559,266 S | 1/2008 | Oh |
| 7,325,744 B2 | 2/2008 | Porter |
| D565,842 S | 4/2008 | Falcone |
| D566,395 S | 4/2008 | Langer et al. |
| D567,032 S | 4/2008 | Gilbert |
| 7,350,642 B2 | 4/2008 | Bjerregaard et al. |
| D569,103 S | 5/2008 | Hoge et al. |
| D570,875 S | 6/2008 | Sheba et al. |
| D578,137 S | 10/2008 | Sheba et al. |
| D578,138 S | 10/2008 | Sheba et al. |
| D578,139 S | 10/2008 | Sheba et al. |
| D578,140 S | 10/2008 | Sheba et al. |
| D578,141 S | 10/2008 | Sheba et al. |
| 7,469,787 B2 | 12/2008 | Yuhara |
| 7,475,816 B1 | 1/2009 | Rochelo |
| D594,874 S | 6/2009 | Sheba et al. |
| D594,875 S | 6/2009 | Sheba et al. |
| 7,970,444 B2 * | 6/2011 | Thornton et al. .......... 455/575.4 |
| 2003/0062275 A1 | 4/2003 | Rochelo |
| 2003/0085285 A1 | 5/2003 | Luu |
| 2004/0026275 A1 | 2/2004 | Margetts et al. |
| 2004/0079656 A1 | 4/2004 | Hoogland |
| 2004/0222954 A1 * | 11/2004 | Lueder ............................ 345/87 |
| 2004/0245128 A1 | 12/2004 | MacColl et al. |
| 2005/0040057 A1 | 2/2005 | Hoogland |
| 2005/0122315 A1 * | 6/2005 | Chalk et al. ................... 345/173 |
| 2005/0155879 A1 | 7/2005 | Hoogland |
| 2005/0167302 A1 | 8/2005 | Bjerregaard et al. |
| 2006/0135228 A1 * | 6/2006 | Kato ........................ 455/575.4 |
| 2006/0208062 A1 | 9/2006 | Osborn et al. |
| 2007/0037619 A1 * | 2/2007 | Matsunaga et al. ........ 455/575.7 |
| 2007/0139343 A1 * | 6/2007 | Wang et al. ..................... 345/98 |
| 2007/0205115 A1 | 9/2007 | Lee |
| 2007/0298840 A1 | 12/2007 | Squires |
| 2009/0144943 A1 | 6/2009 | Arranz Del Rosal et al. |
| 2009/0171715 A1 | 7/2009 | Conley et al. |

FOREIGN PATENT DOCUMENTS

KR  3004-467270000  4/2007

OTHER PUBLICATIONS

Notice of Allowance and Fee(s) Due for U.S. Appl. No. 29/319,351 (Mar. 31, 2009).

Notice of Allowance and Fee(s) Due for U.S. Appl. No. 29/319,349 (Mar. 31, 2009).

"G2-Mini SD Memory Card Case," InAnyCase.com, http://www.inanycase.com/Merchant2/merchant.mv?Session_ID=48B04D6900084CE400 . . . , 1 page (Printed Aug. 23, 2008).
Photo of Memory Card Case, http://www.bluenook.com/display_image.asp?img=img%2Fproducts%2Fcase%5Flowepro . . . , 1 page (Printed Aug. 23, 2008).
Photo of Memory Card Case, http://www.myaccessorymall.com/upload/Product/CZU003_zoom2.jpg, 1 page (Printed Aug. 23, 2008).
Business Wire Commercial Photo of Memory Card Case, http://cache.daylife.com/imageserve/044R5es3zg5yO/610x.jpg, 1 page (Printed Jul. 28, 2008).
Photo of Memory Card Case, http://www.altec-cs.com/media/produkte/flash_speicherk/micro-sd/microSD_2xAdapt_mr . . . , 1 page (Printed Jul. 28, 2008).
Notice of Allowance and Fee(s) Due for U.S. Appl. No. 29/293,986 (Jul. 23, 2008).
Notice of Allowance and Fee(s) Due for U.S. Appl. No. 29/293,983 (Jul. 14, 2008).
Notice of Allowance and Fee(s) Due for U.S. Appl. No. 29/293,982 (Jul. 14, 2008).
Notice of Allowance and Fee(s) Due for U.S. Appl. No. 29/293,985 (Jul. 11, 2008).
Notice of Allowance and Fee(s) Due for U.S. Appl. No. 29/293,984 (Jul. 11, 2008).
Non-Final Official Action for U.S. Appl. No. 29/293,986 (Jun. 5, 2008).
Non-Final Official Action for U.S. Appl. No. 29/293,985 (Mar. 17, 2008).
Non-Final Official Action for U.S. Appl. No. 29/293,982 (Mar. 17, 2008).
Non-Final Official Action for U.S. Appl. No. 29/293,984 (Mar. 14, 2008).
Notice of Allowance for U.S. Appl. No. 29/293,979 (Mar. 14, 2008).
Sony—MP3 Player Walkman® A810 Series, http://www.sonystyle.com/webapp/wcs/stores/servlet/CategoryDisplay?catalogId=10551&storeId=10151&langID=-1&categoryId=3690, p. 1 (Printed Sep. 28, 2007).
Toshiba—Portable Media Player Gigabeat, http://www.toshibadirect.com/td/b2c/content.to?page=giga_index, p. 1 (Printed Sep. 28, 2007).
Zune—Digital Media Player Zune, http://www.zune.net/en-US/meetzune/, p. 1 (Printed Sep. 28, 2007).
"SanDisk Sansa View," http://www.sandisk.com/Corporate/PressRoom/PressReleases.asp?ID=3959, pp. 1-2 (Sep. 10, 2007).
Images of SanDisk Sansa View, http://www.sandisk.com/sansa/, pp. 1-8 (Sep. 10, 2007).
SanDisk—Music and Video Players, http://www.sandisk.com/Products/Catalog(1010)-Music_and_Video_Players.aspx, pp. 1-2 (Printed Sep. 8, 2007).
SanDisk—SanDisk Digital Audio Players, http://www.sandisk.com/Products/Catalog(1072)-SanDisk_Digital_Audio_Players.aspx, pp. 1-2 (Printed Sep. 8, 2007).
SanDisk—SanDisk Sansa® Clip MP3 Player, http://www.sandisk.com/Products/Catalog(1363)-SanDisk_Sansa_Clip.aspx, pp. 1-2 (Printed Sep. 8, 2007).
SanDisk—SanDisk Sansa® Express™ MP3 Players, http://www.sandisk.com/Products/Catalog(1226)-SanDisk_Sansa_Express_MP3_Players.aspx, pp. 1-2 (Printed Sep. 8, 2007).
SanDisk—SanDisk Sansa® Connect™ MP3 Player, http://www.sandisk.com/Products/Catalog(1249)SanDisk_Sansa_Connect_MP3_Player.aspx, p. 1 (Printed Sep. 8, 2007).
SanDisk—SanDisk Sansa® c100 Series MP3 Players, http://www.sandisk.com/Products/Catalog(1165)-SanDisk_Sansa_c100_Series_MP3_Players.aspx, pp. 1-2 (Printed Sep. 8, 2007).
SanDisk—SanDisk Sansa® c200 Series MP3 Players, http://www.sandisk.com/Products/Catalog(1199)-SanDisk_Sansa_c200_Series_MP3_Players.aspx, pp. 1-2 (Printed Sep. 8, 2007).
SanDisk—SanDisk Sansa® e100 Series MP3 Players, http://www.sandisk.com/Products/Catalog(1073)-SanDisk_Sansa_e100_Series_MP3_Players.aspx, pp. 1-2 (Printed Sep. 8, 2007).
SanDisk—SanDisk Sansa® e200 Series MP3 Players, http://www.sandisk.com/Products/Catalog(1166)-SanDisk_Sansa_e200_Series_MP3_Players.aspx, pp. 1-3 (Printed Sep. 8, 2007).
SanDisk—SanDisk Sansa® e200R Rhapsody Series MP3 Players, http://www.sandisk.com/Products/Catalog(1220)-SanDisk_Sansa_e200R_Rhapsody_Series_MP3_Players.aspx, pp. 1-2 (Printed Sep. 8, 2007).
SanDisk—SanDisk Sansa® m200 Series MP3 Players, http://www.sandisk.com/Products/Catalog(1161)-SanDisk_Sansa_m200_Series_MP3_Players.aspx, pp. 1-2 (Printed Sep. 8, 2007).
"SanDisk Announces the Colorfully Hip 'Sansa Clip': a Tiny, Wearable MP3 Player with Big Sound," http://sandisk.com/Corporate/PressRoom/PressReleases/PressRelease.aspx?ID=3926, pp. 1-2 (Printed Sep. 6, 2007).
"iRiver Clix (8GB, second generation)," http://reviews.cnet.com/mp3-players/iriver-clix-8gb-second/4505-6490_7-32425795.html2 . . . , 5 pgs. (Apr. 25, 2007).
"Creative Labs Zen V Plus 8GB MP3 Player," http://www.bestbuy.com/site/olspage.jsp?skuId=8231683&st=mp3&lp=1&type=product&cp=1&id=1167445402309, pp. 1-3 (Printed Feb. 1, 2007).
"Creative Labs Zen Vision: M 30GB* MP3 Player and Image Viewer—White," http://www.bestbuy.com/site/olspage.jsp?skuId=7978478&st=mp3&lp=8&type=product&cp=1&id=1153998870556, pp. 1-3 (Printed Feb. 1, 2007).
"Microsoft Zune MP3 Player with 30 GB Hard Drive—Black," http://www.bestbuy.com/site/olspage.jsp?skuId=8132772&st=mp3&lp=3&type=product&cp=1&id=1158321661056, pp. 1-2 (Printed Feb. 1, 2007).
"Samsung 2GB* MP3 Player and Image Viewer—Black," http://www.bestbuy.com/site/olspage.jsp?skuId=7994735&st=mp3&lp=11&type=product&cp=1&id=1155070316629, pp. 1-2 (Printed Feb. 1, 2007).
"SanDisk Sansa e250R Rhapsody 2GB* MP3 Player," http://www.bestbuy.com/site/olspage.jsp?skuId=7995468&st=mp3&lp=13&type=product&cp=1&id=1155070321394, pp. 1-3 (Printed Feb. 1, 2007).
Photograph of Toshiba Gigabeat, p. 1 (2007).
"iRiver Clix (2GB)," http://reviews.cnet.com/mp3-playersftriver-clix-2gb/4505-6490_7-31861628.html?tag=rnav, 7 pgs. (May 14, 2006).
Hardy, "SD/MMC Card Holder Review," Palm Infocenter, http://www.palminfocentercom/news/3025/review-sd-mmc-card-holder, 6 pages (Feb. 22, 2002).
Notice of Abandonment for U.S. Appl. No. 12/001,309 (Nov. 24, 2010).
"iPod shuffle," http:www.apple.com/ipodshuffle, 4 pages (May 28, 2008).
Non-Final Official Action for U.S. Appl. No. 12/001,309 (May 10, 2010).

* cited by examiner

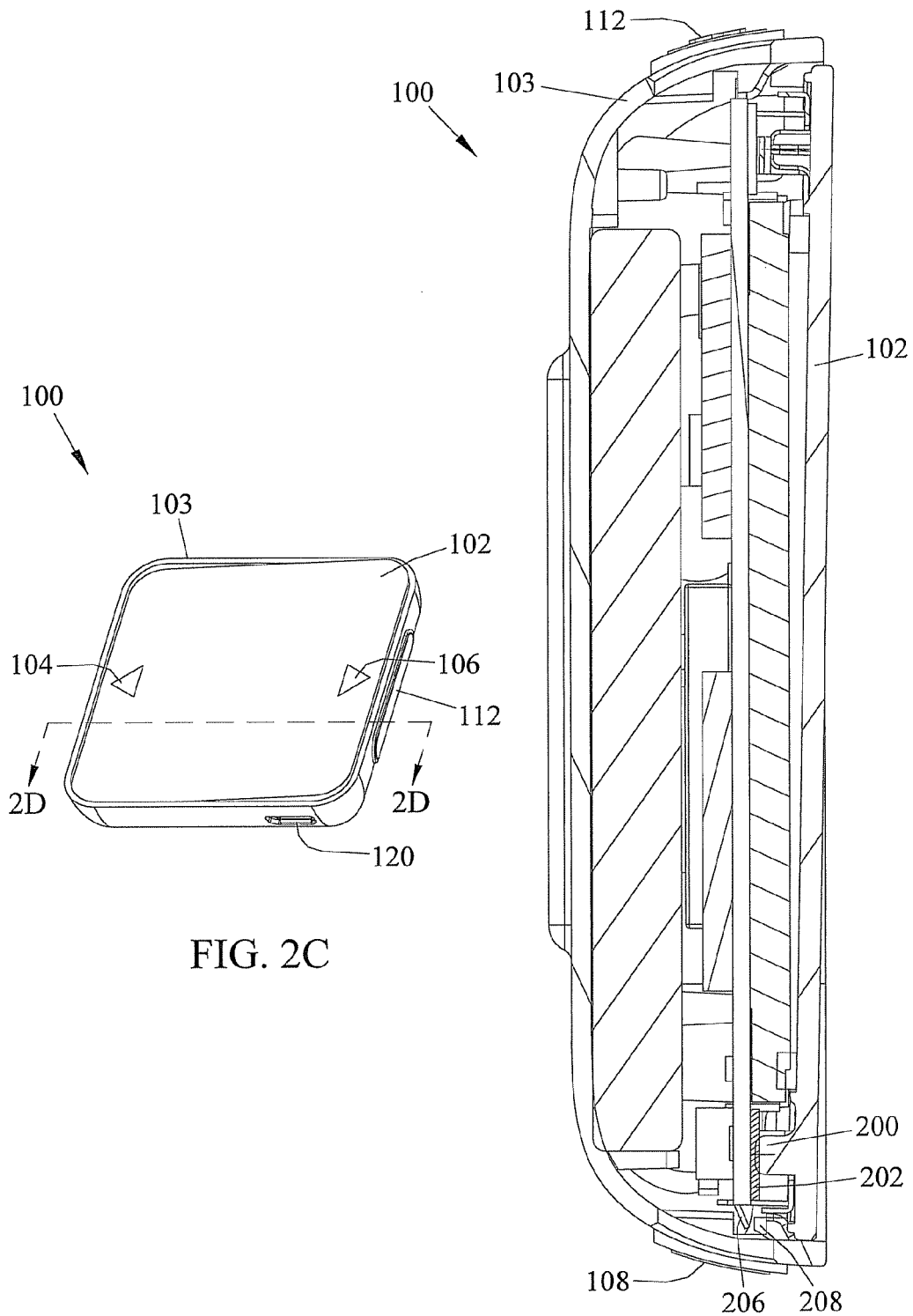

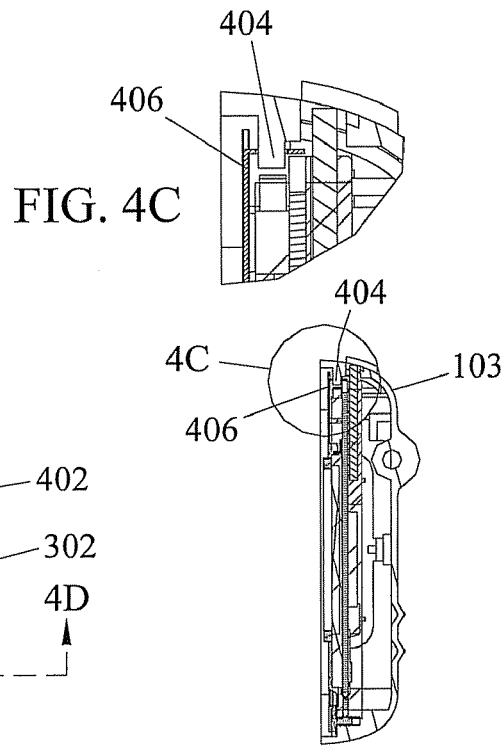
FIG. 4C
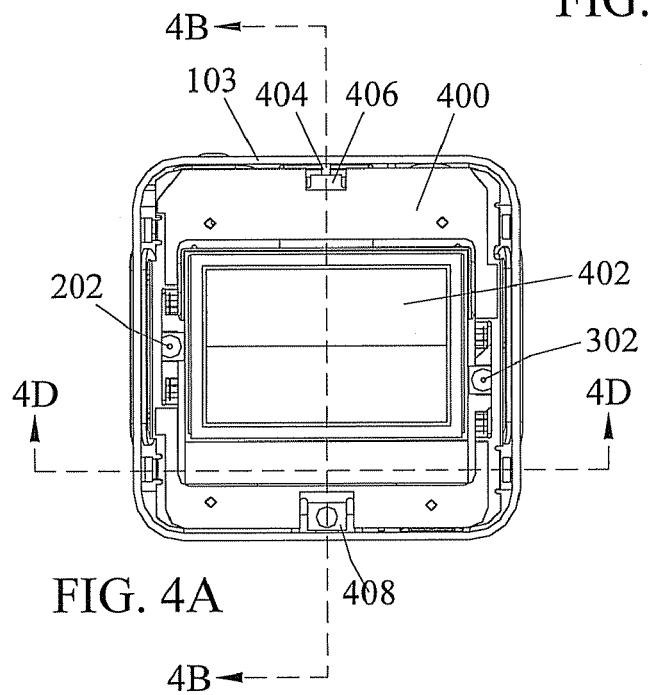
FIG. 4A
FIG. 4B
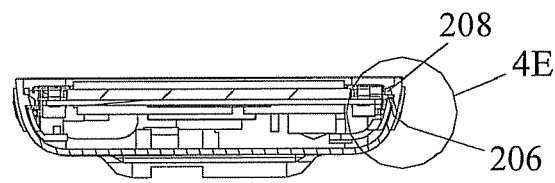
FIG. 4D
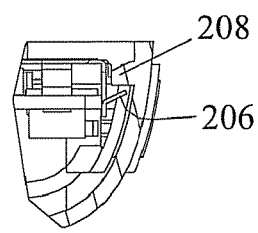
FIG. 4E
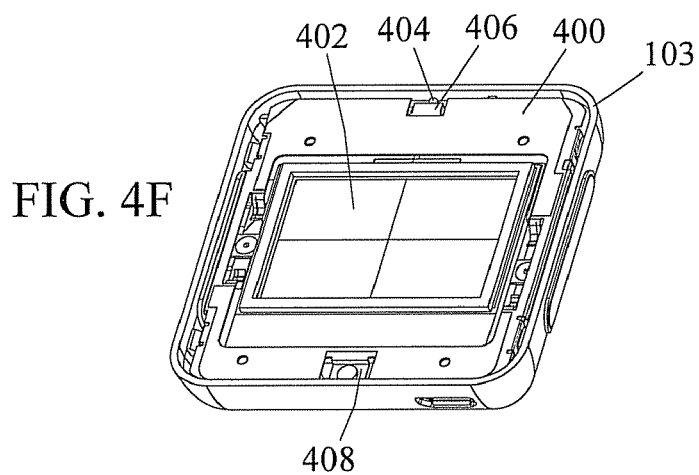
FIG. 4F

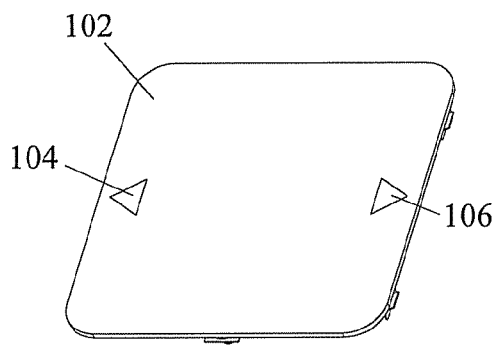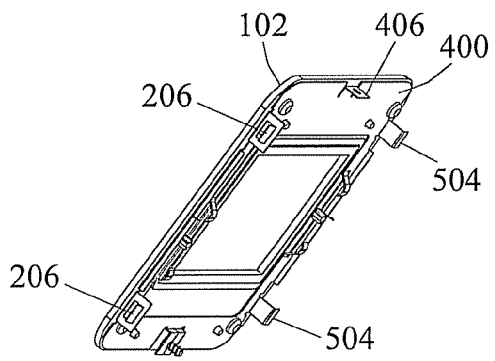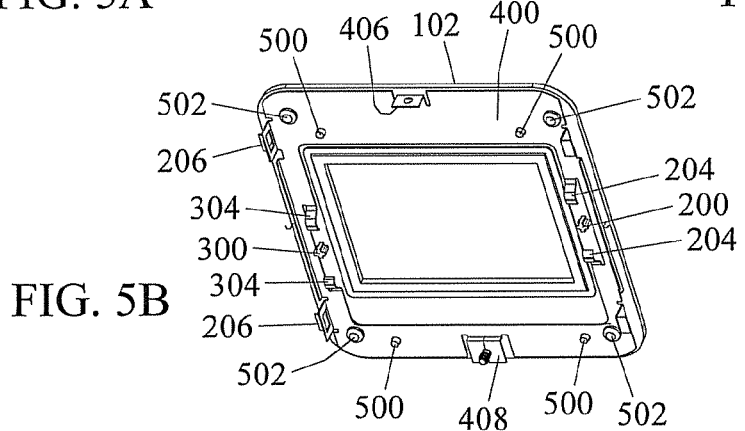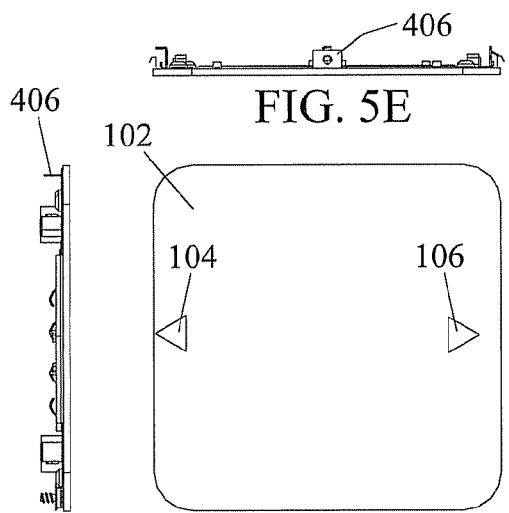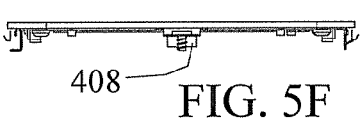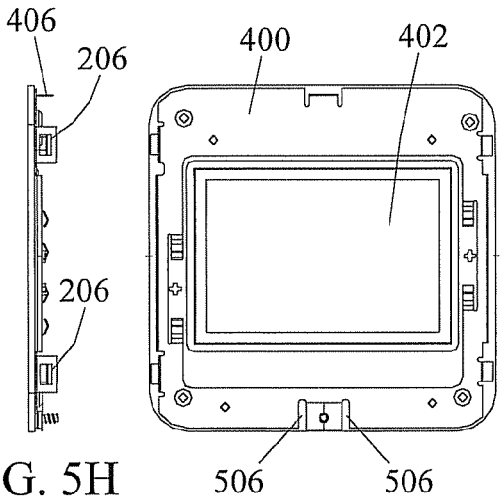

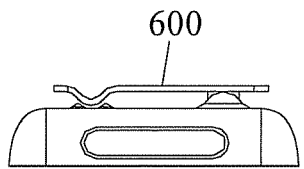
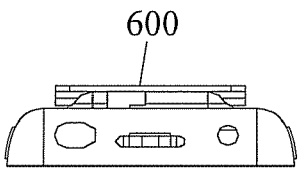
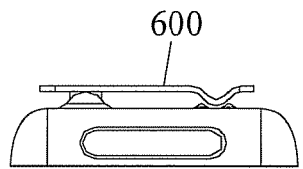
FIG. 9E   FIG. 9B   FIG. 9F
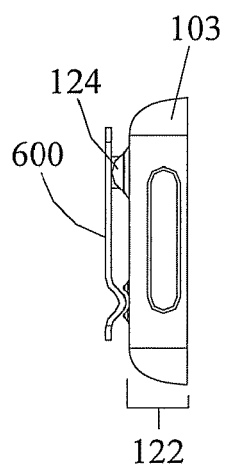
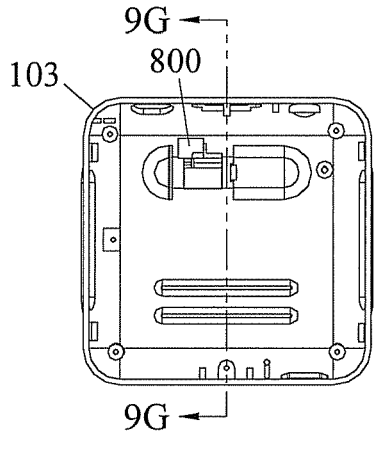
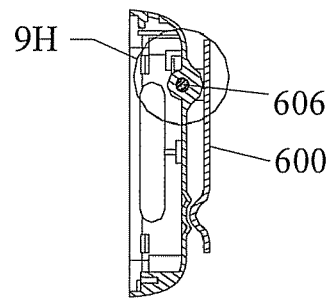
FIG. 9D   FIG. 9A   FIG. 9G
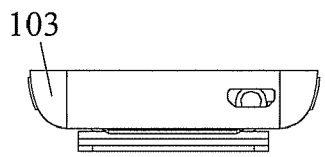
FIG. 9C
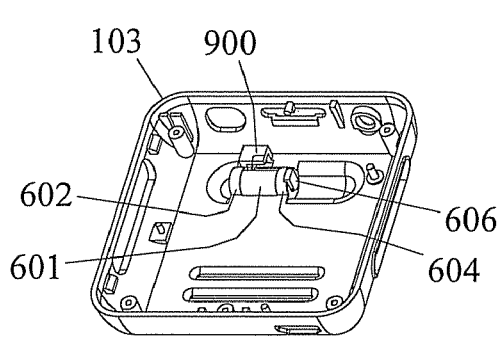
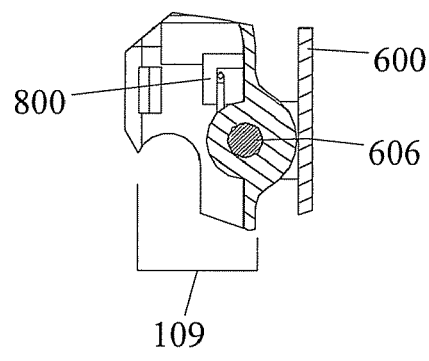
FIG. 9I   FIG. 9H

HOUSING AND CLIP ASSEMBLY FOR PORTABLE ELECTRONICS DEVICE

TECHNICAL FIELD

The subject matter described herein relates to portable electronics devices. More particularly, the subject matter described herein relates to a housing and clip assembly for a portable electronics device.

BACKGROUND

Portable electronics devices, such as personal media players, mobile phones, personal digital assistants (PDAs), smart phones, portable radios, and combinations thereof, are pervasive among technology-educated users. For example, teenagers, young adults, and business people who were introduced to the Internet and portable electronics devices at a young age are capable of operating portable electronics devices with complex user interfaces and thus are likely to purchase and use portable electronics devices, even those with complex user interfaces. However, potential new users of such devices may be intimidated by the complexity of the user interfaces associated with portable electronics devices, and, for this reason, may forgo purchasing or using a portable electronics device.

In order to make portable electronics devices appealing to a wider range of users, it is desirable design such devices such that they are easy to use and to carry or wear. In addition, it is desirable to design portable electronics devices to be easy to manufacture, as ease of manufacture can reduce the cost of a portable electronics device and thereby increase its appeal to a wider range of users.

One feature of a portable electronics device that is important to both the goals of user interface simplification and ease of manufacturing is the housing. A housing holds the components of a portable electronics device and provides at least a portion of the user interface. For example, a housing for a portable electronics device may enclose a display and processing circuitry for a portable electronics device and may include one or more actuators to activate the functions of the portable electronics device. The housing may also include a clip assembly to allow the device to be displayed in a retail sales establishment and worn by a user during use.

One type of housing for portable electronics devices includes a sensor pad for activating device functions. For example, some commercially available MP3 players include sensor pads that are activated through capacitive coupling when a user's finger contacts the sensor pad. The sensor pad is used in combination with a display that displays a series of menus that are navigable using the sensor pad to activate device functions. One problem with portable electronics devices that include sensor pads is that the combination of the sensor pad and display menus to control device functions is unnecessarily complex for some users. Navigating through a hierarchy of menus to perform a simple action, such as playing a song, is not an intuitive operation for most users. As a result, such devices may not be adopted by users who desire a simpler interface.

A clip assembly for a portable electronics device may include a clip located on the back side of the device where the clip is biased by a spring assembly to maintain a closed position. In one existing portable electronics device design, the device housing includes a protrusion, and the spring assembly is located entirely in the protrusion. The result of locating the spring assembly entirely in the protrusion is that the protrusion is substantially equal in thickness to the main body of the housing. Such protrusions make the devices less aesthetically pleasing to the user and prevent the devices from being worn flat against a user's clothing. Because of the relatively large protrusions, the devices have an increased likelihood of being pulled away from the user's clothing through contact with stationary objects during use. In addition, a user is less likely to want to wear a portable electronics device that protrudes substantially from the user's clothing.

Accordingly, in light of these difficulties associated with housings and clip assemblies for portable electronics devices, there exists a need for an improved housing and clip assembly for a portable electronics device.

SUMMARY

The subject matter described herein includes a housing and clip assembly for a portable electronics device. According to one aspect of the subject matter described herein, a housing for a portable electronics device is provided. The housing includes a housing member for holding components of the portable electronics device. The components include a display. The housing further includes a lens coupled to the housing member for allowing viewing of the display. The lens includes a first position at rest and pivots to a second position for controlling a function of the portable electronics device.

According to another aspect, the subject matter described herein includes a housing and clip assembly for a portable electronics device. The housing and clip assembly includes a housing defining an enclosure for holding components of a portable electronics device. A clip assembly is coupled to the housing for attaching the housing to a desired article for display or use of the portable electronics device. The clip assembly includes a clip member that pivots angularly outward from the housing to attach the housing to the desired article. The clip assembly includes a spring assembly for biasing the clip member towards the housing. The housing includes a main body and a protrusion extending outward from the main body. The protrusion includes an aperture for receiving the spring assembly such that at least a portion of the spring assembly extends into a region enclosed by the main body of the housing.

According to another aspect, the subject matter described herein includes a housing for a portable electronics device. The housing includes a housing member for holding components of the portable electronics device. The components include a display. The housing member comprises a unitary member that defines five faces of a substantially rectangular parallelepiped. The housing further includes a lens coupled to the housing member for allowing viewing of the display. The lens comprises a unitary member defining a sixth face of the substantially rectangular parallelepiped. The lens has a first position at rest and pivots towards the housing member to a second position and to a third position pivotally opposite the second position for controlling a function of the portable electronics device.

According to another aspect of the subject matter described herein, a housing and clip assembly for a portable electronics device is provided. The housing and clip assembly includes a housing including a housing member for holding components of a portable electronics device. The components include a display. The housing includes a lens coupled to the housing member for allowing viewing of the display. The lens includes a first position at rest and pivots to a second position for controlling a function of the portable electronics device. The housing member and the lens define an enclosure. The housing and clip assembly further includes a clip assembly coupled to the housing for attaching the housing to a desired article for display or use of the portable electronics device. The clip assembly includes a clip member for pivoting angularly outward from the housing for attaching the housing to the desired article. The clip assembly includes a spring assembly for biasing the clip member towards the housing. The housing includes a main body and a protrusion extending outward from the main body. The housing includes an aperture for receiving the spring assembly such that at least a portion of the spring assembly extends within a region enclosed by the main body, thereby decreasing a profile of the housing and clip assembly.

BRIEF DESCRIPTION OF THE DRAWINGS

Preferred embodiments of the subject matter described herein will now be explained with reference to the accompanying drawings of which:

FIG. 2C is a perspective view and FIG. 2D is a sectional view from line 2D-2D illustrated in 2C of a housing for a portable electronics device according to an embodiment of the subject matter described herein;

FIG. 4A is a front view of a housing member illustrating components that may be housed in a portable electronics device according to an embodiment of the subject matter described herein;

FIG. 4B is a sectional view of a housing member and exemplary components that may be included therein from section line 4B-4B in FIG. 4A;

FIG. 4C is a magnified view of a portion of the housing member illustrated in FIG. 4B;

FIG. 4D is a sectional view of a housing member and exemplary components that may be housed therein from line 4D-4D in FIG. 4A;

FIG. 4E is a magnified view of a portion of the housing member illustrated in FIG. 4D according to an embodiment of the subject matter described herein;

FIG. 4F is a perspective view of a housing member for a portable electronics device and exemplary components that may be included in the housing member according to an embodiment of the subject matter described herein;

FIG. 5A is a front perspective view of a lens for a portable electronics device according to an embodiment of the subject matter described herein;

FIG. 5B is a rear perspective view of a lens and a coupling member for coupling the lens to the housing member of a portable electronics device according to an embodiment of the subject matter described herein;

FIG. 5C is a left side rear perspective view of a lens and a coupling member for coupling the lens to the housing member of a portable electronics device according to an embodiment of the subject matter described herein;

FIGS. 5D-5H illustrate front, top, bottom, and side views of a lens and coupling member for coupling the lens to the housing member of a portable electronics device according to an embodiment of the subject matter described herein;

FIG. 5I is a rear view of a lens and a coupling member for coupling the lens to a portable electronics device according to an embodiment of the subject matter described herein;

FIGS. 9A-9F illustrate front, top, bottom, and side views of a housing and clip assembly for a portable electronics device, where the clip member is shown in a closed position according to an embodiment of the subject matter described herein;

FIG. 9G is a sectional view from line 9G-9G illustrated in FIG. 9A of a housing and clip assembly for a portable electronics device with a clip in the closed position according to an embodiment of the subject matter described herein;

FIG. 9H is a magnified view of a portion of the housing and clip assembly illustrated in FIG. 9G according to an embodiment of the subject matter described herein;

FIG. 9I is a perspective view of a housing and clip assembly for a portable electronics device according to an embodiment of the subject matter described herein;

DETAILED DESCRIPTION

Figure 1D:
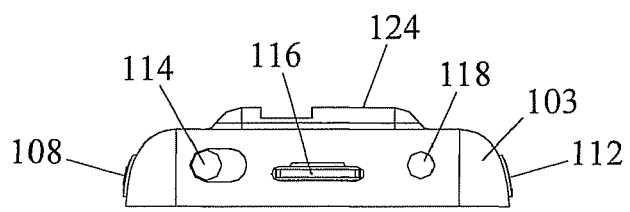
FIGS. 1A-1D illustrate front and side views of a housing for a portable electronics device according to an embodiment of the subject matter described herein.

The subject matter described herein includes a housing and clip assembly for a portable electronics device. As stated above, a portable electronics device may include a mobile phone, a media player, a portable radio, a PDA, a smart phone, or any combination thereof. In the examples presented below, the portable electronics device comprises a media player with an integrated radio function. However, it is understood that the subject matter described herein can be applied to any type of portable electronics device where device functions are activated via features of the housing.

FIGS. 1A-1F illustrate various views of a housing for a portable electronics device according to an embodiment of the subject matter described herein. Referring to FIGS. 1A-1D, housing 100 includes a lens 102 and a housing member 103 that form an enclosure for housing components of a portable electronics device. Lens 102 may comprise a transparent material, such as a photonic crystal material, for allowing viewing of a display located within housing 100. In addition, lens 102 may also be an actuator that controls functions of the portable electronics device. In the illustrated example, lens 102 includes left and right side button indicators 104 and 106 that may be formed in or on lens 102 to indicate to the user a location or area of lens 102 to apply pressure to control a function of the portable electronics device. As will be described in more detail below, applying pressure in the area of side button indicator 104 or 106 causes lens 102 to pivot and control a function of the portable electronics device. In one example, when the portable electronics device includes a radio function, pivoting lens 102 by applying pressure to side button indicator 104 or 106 may tune the radio to a desired frequency.

When assembled, lens 102 and housing member 103 form a substantially rectangular parallelepiped that encloses the components of the portable electronics device. For example, housing member 103 may be a unitary member that forms five faces of the substantially rectangular parallelepiped, and lens 102 may be a unitary member that forms a sixth face of the substantially rectangular parallelepiped.

In addition to lens 102, housing 100 may include other actuators and interfaces that may be used to control functions of a portable electronics device. In the illustrated example, actuators and interfaces that may be accessible via housing 100 include a volume control 108, a skip button 112, a mode control button 114, a memory card slot 116, a headphone jack 118, and, as illustrated in FIGS. 1E and 1F, a micro USB jack 120. Volume control 108 controls volume of media played by the portable electronics device. Skip button 112 skips between discrete elements of media content, such as songs or video clips being played to the user via the portable electronics device. Mode control button 114 switches between different device modes. For example, if the portable electronics device housed by housing 100 is a combination radio/media player, mode control button 114 may allow the user to switch between the radio and media player modes.

Memory card slot 116 receives a memory card, such as a micro SD card preconfigured with media content to be played by the portable electronics device. Providing the ability to receive memory cards with preconfigured media content allows the portable electronics device housed by housing 100 to be used without requiring the user to download media content from the Internet or other source, which makes the portable electronics device housed by housing 100 easier to use.

Headphone jack 118 receives a male connector for headphones, speakers, or other external devices used for delivering media content to the user. Micro USB jack 120 connects to a micro USB cable or a micro USB compatible device. For example, micro USB jack 120 may connect to a micro USB cable that connects the device enclosed by housing 100 to the USB port of a personal computer for charging batteries of the device enclosed by housing 100 and managing media content stored by the device housed by housing 100.

In the example illustrated in FIGS. 1A-1F, the actuators and interfaces shown are those that may be associated with a personal media player. However, the subject matter described herein is not limited to these actuators or interfaces. Any number of actuators or interfaces may be included or omitted without departing from the scope of the subject matter described herein.

Figure 1B:
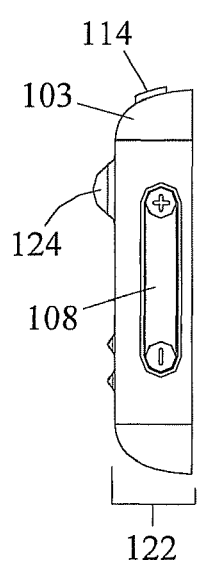
Figure 1A:
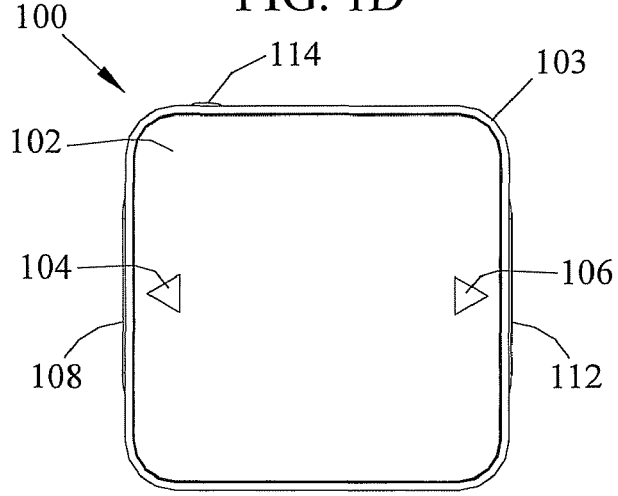
Figure 1C:
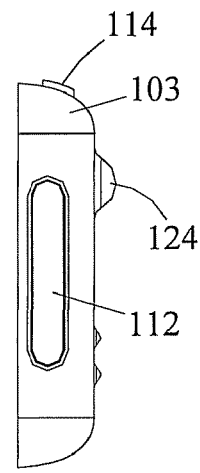
Figure 1F:
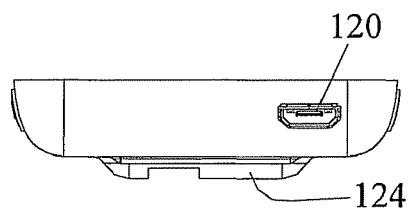
FIGS. 1E and 1F illustrate perspective and side views of a housing for a portable electronics device according to an embodiment of the subject matter described herein.
Figure 1E:
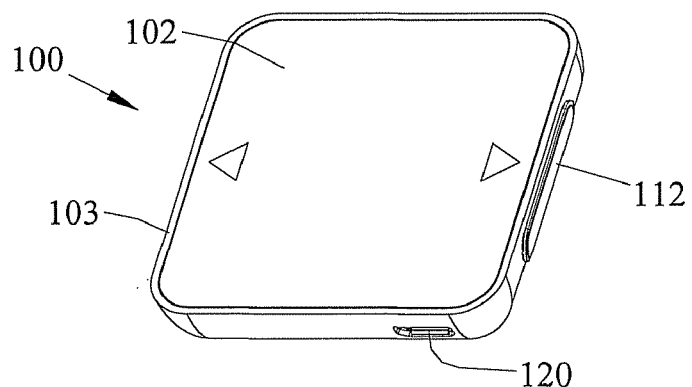

As illustrated in detail in FIG. 1B, housing member 103 includes a main body 122 and a protrusion 124. Main body 122 may house the components of a portable electronics device. Protrusion 124 may house a portion of a coil spring assembly used to bias a clip (not shown in FIGS. 1A-1F) for attaching housing 100 to a desired article during use or display. However, as will be described in more detail below, at least a portion of the coil spring assembly that biases the clip may reside in main body 122, which decreases the required thickness of protrusion 124 and allows housing 100 to be worn flatter against a user's clothing during use. Protrusion 124 may also serve as the fulcrum for opening and closing the clip. Details of the clip assembly and its operation will be described below.

Figures 2A, 2B:
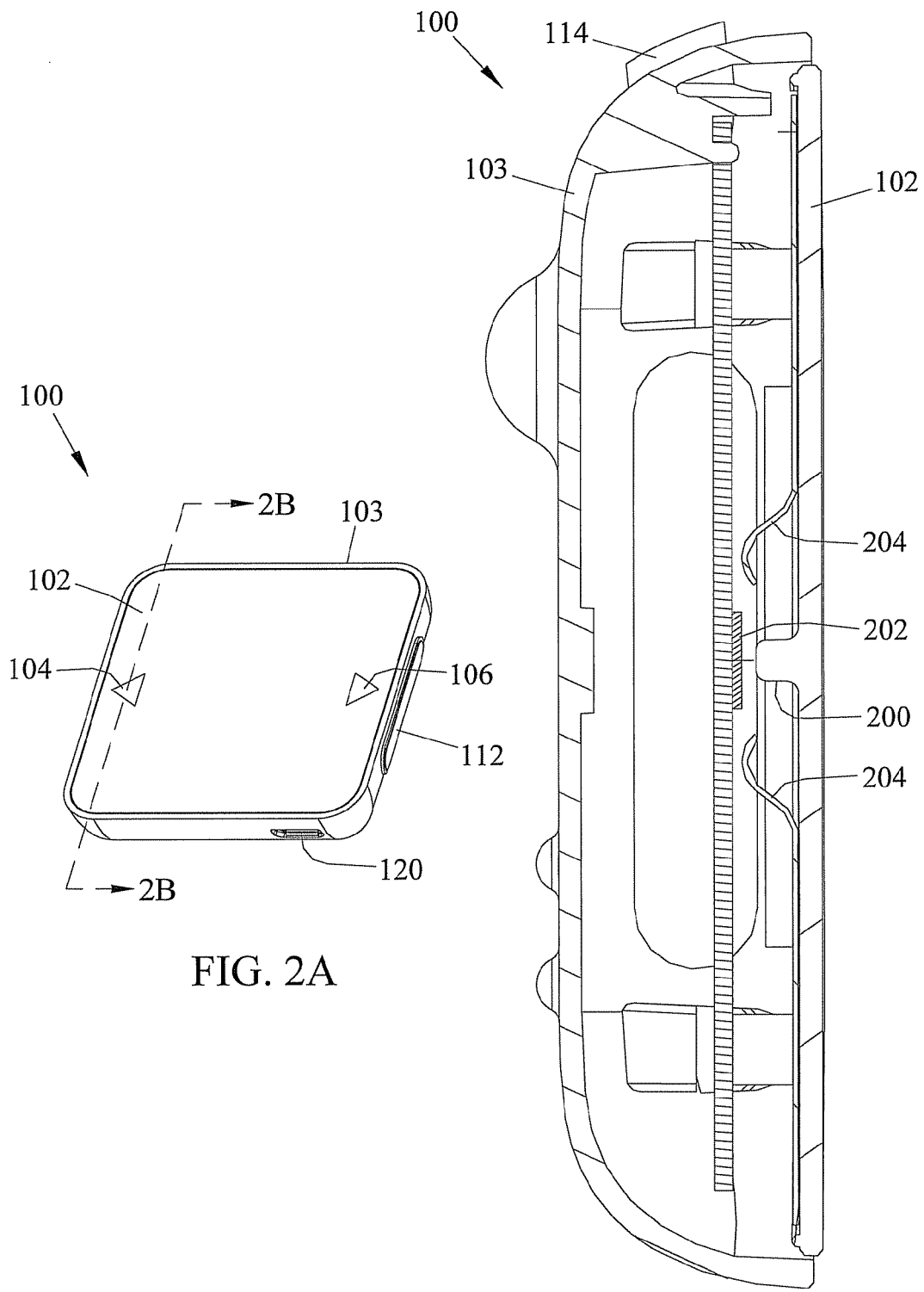
FIG. 2A is a perspective view and FIG. 2B is a sectional view from line 2B-2B illustrated in FIG. 2A of a housing for a portable electronics device according to an embodiment of the subject matter described herein.

As stated above, lens 102 may pivot to actuate a function of a portable electronics device. FIGS. 2A-3F illustrate this pivoting feature. Referring to FIGS. 2A and 2B, which respectively illustrate a perspective view and a vertical sectional view of housing 100, lens 102 may include a left side protrusion 200 located on a rear surface of lens 102 for activating a portable electronics device function through contact with a left side switch 202 located in housing member 103. In FIG. 2B, lens 102 is shown in the rest position where switch 202 is not activated. Biasing members 204 may facilitate the biasing of lens 102 towards the rest position when lens 102 is pivoted towards housing member 103 from the rest position to facilitate the return of lens 102 to the rest position when the user releases pressure from lens 102.

FIGS. 2C and 2D respectively illustrate a perspective view and a horizontal sectional view of housing 100 when lens 102 is pivoted by applying pressure to the side of lens 102 corresponding to left side button indicator 104. Lens 102 may pivot about an axis that extends orthogonally to and that intersects the midpoint of a line joining side button indicators 104 and 106. Lens 102 may pivot inwards towards housing member 103 through substantially equal ranges in each of its pivot directions. Measured in degrees, in one exemplary implementation, lens 102 may pivot from about zero degrees at rest to about one degree inward on the side of housing 100 corresponding to side button indicator 104 and from about zero degrees at rest to about one degree inward on the side of housing 100 corresponding to side button indicator 106.

As illustrated in FIG. 2D, when lens 102 pivots inward on the side of housing 100 corresponding to side button indicator 104, the side of lens 102 corresponding to side button indicator 106 protrudes slightly outward from main body 103. Such protrusion is less than the thickness of lens 102 and advancement is limited by contact between a hook 206 and a protrusion 208 of housing member 103. The interaction between hook 206 and protrusion 208 will be described in more detail below.

As illustrated in FIG. 2D, protrusion 200 contacts switch 202 when lens 102 is pivoted inward towards housing member 103 by applying pressure to the side of lens 102 corresponding to left side button indicator 104. When protrusion 200 contacts switch 202, switch 202 may activate a function of a portable electronics device. As stated above, in one example, the portable electronics device housed by housing 100 may include a radio. In this example, switch 202 may interact with a tuning module of the radio to decrease the frequency to which the radio is tuned when switch 202 is contacted by protrusion 200.

Figures 2E, 2F:
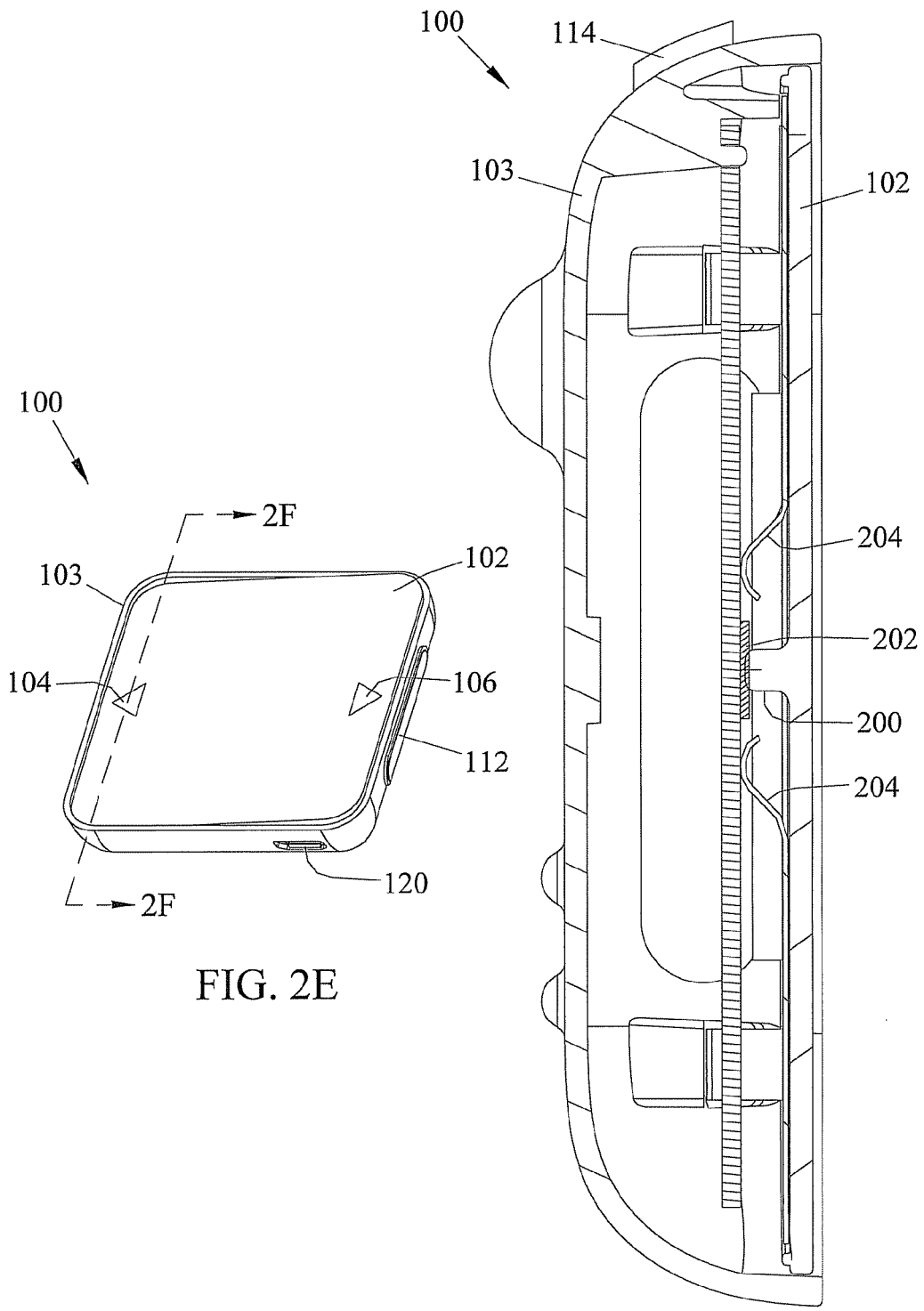
FIG. 2E is a perspective view and FIG. 2F is a sectional view from line 2F-2F illustrated in FIG. 2E of a housing for a portable electronics device according to an embodiment of the subject matter described herein.

FIGS. 2E and 2F respectively illustrate a perspective view and a vertical sectional view of housing 100 when lens 102 is pivoted by applying pressure to the side of lens 102 corresponding to left side button indicator 104. In FIG. 2F, it can be seen that biasing members 204 bend towards lens 102 to bias lens 102 towards the rest position when lens 102 is pivoted. As stated above, this biasing towards the rest position allows lens 102 to return to the rest position when the user releases pressure applied to lens 102.

Figures 3A, 3B:
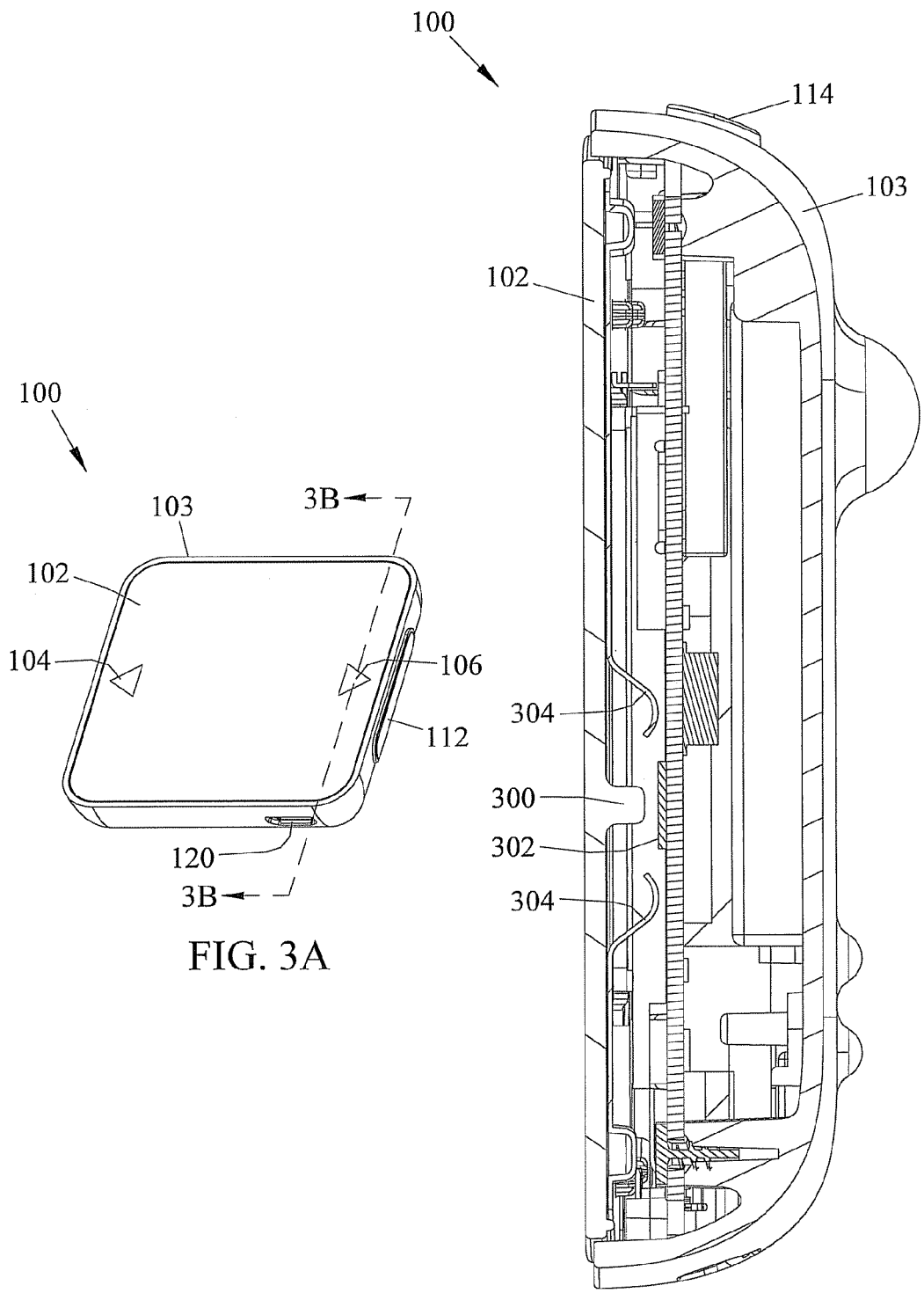
FIG. 3A is a perspective view and FIG. 3B is a sectional view from line 3B-3B illustrated in FIG. 3A of a housing for a portable electronics device according to an embodiment of the subject matter described herein.

FIGS. 3A and 3B respectively illustrate a front view and a vertical sectional view of housing member 103 and lens 102 from the side of housing 100 corresponding to right side button indicator 106 when lens 102 is in the rest position. In FIG. 3B, lens 102 includes a protrusion 300 located on a right hand of its rear surface side for contacting a switch 302 located within housing member 103 when a side of lens 102 corresponding right side button indicator 106 is pivoted towards housing member 103. Biasing members 304 bias lens 102 toward the rest position when lens 102 is pivoted towards housing member 103 when pressure is applied to a side of lens 102 corresponding to right side button indicator 106.

Figures 3C, 3D:
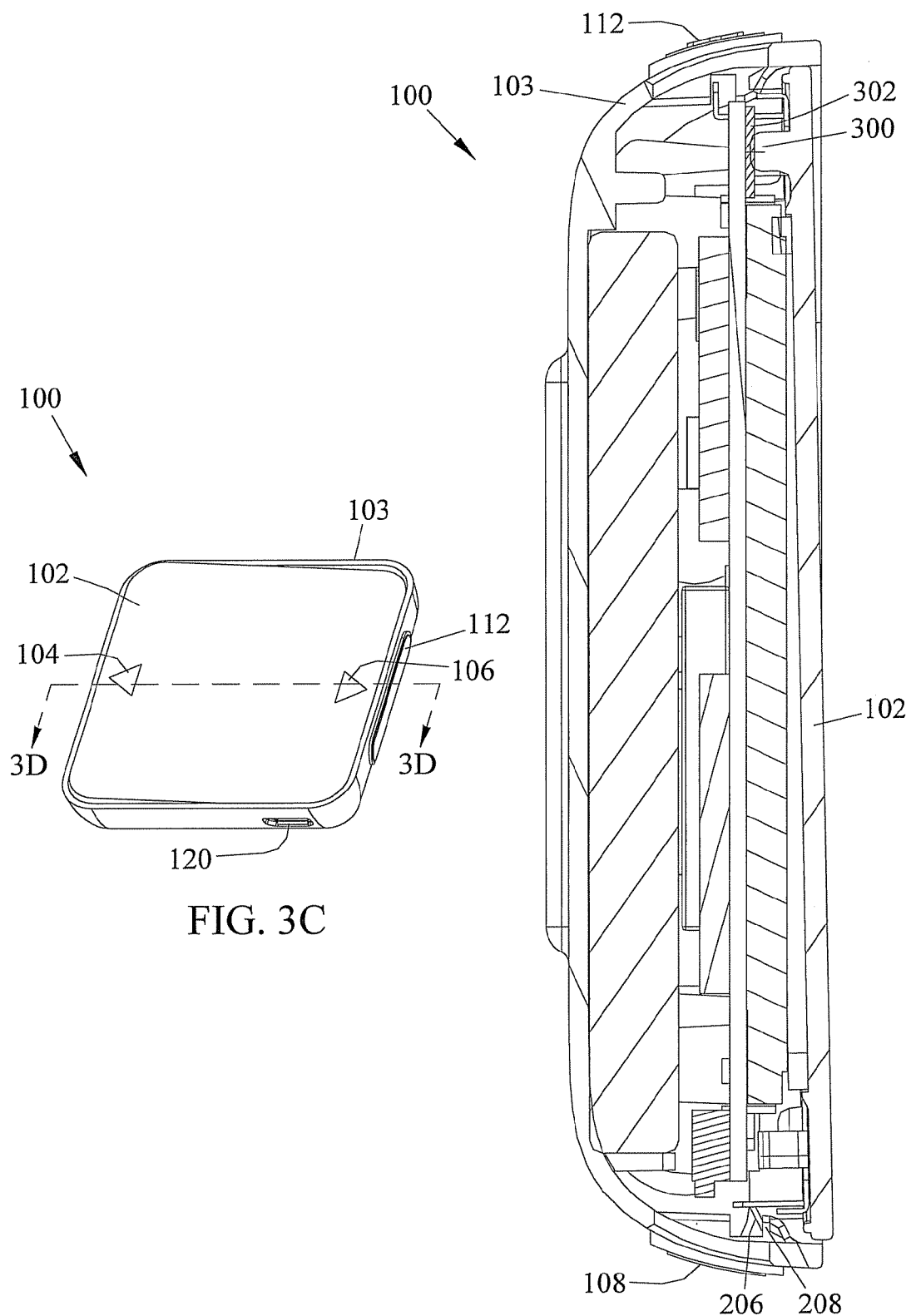
FIG. 3C is a perspective view and FIG. 3D is a sectional view from line 3D-3D illustrated in FIG. 3C of a housing for a portable electronics device according to an embodiment of the subject matter described herein.

FIGS. 3C and 3D illustrate perspective and horizontal sectional views of housing member 103 and lens 102 when lens 102 is pivoted by applying pressure to the side of lens 102 corresponding to right side button indicator 106. When pressure is applied to the side of lens 102 corresponding to right side button indicator 106, lens 102 pivots in a direction that is pivotally opposite the direction that lens 102 pivots when pressure is applied to the side of lens 102 corresponding to the left side button indicator 104. As illustrated in FIG. 3D, protrusion 300 contacts switch 302 to control a function of the portable electronics device. Continuing with the radio example, the contact between protrusion 300 and switch 302 may tune the radio by increasing a frequency to which the radio is tuned.

Figures 3E, 3F:
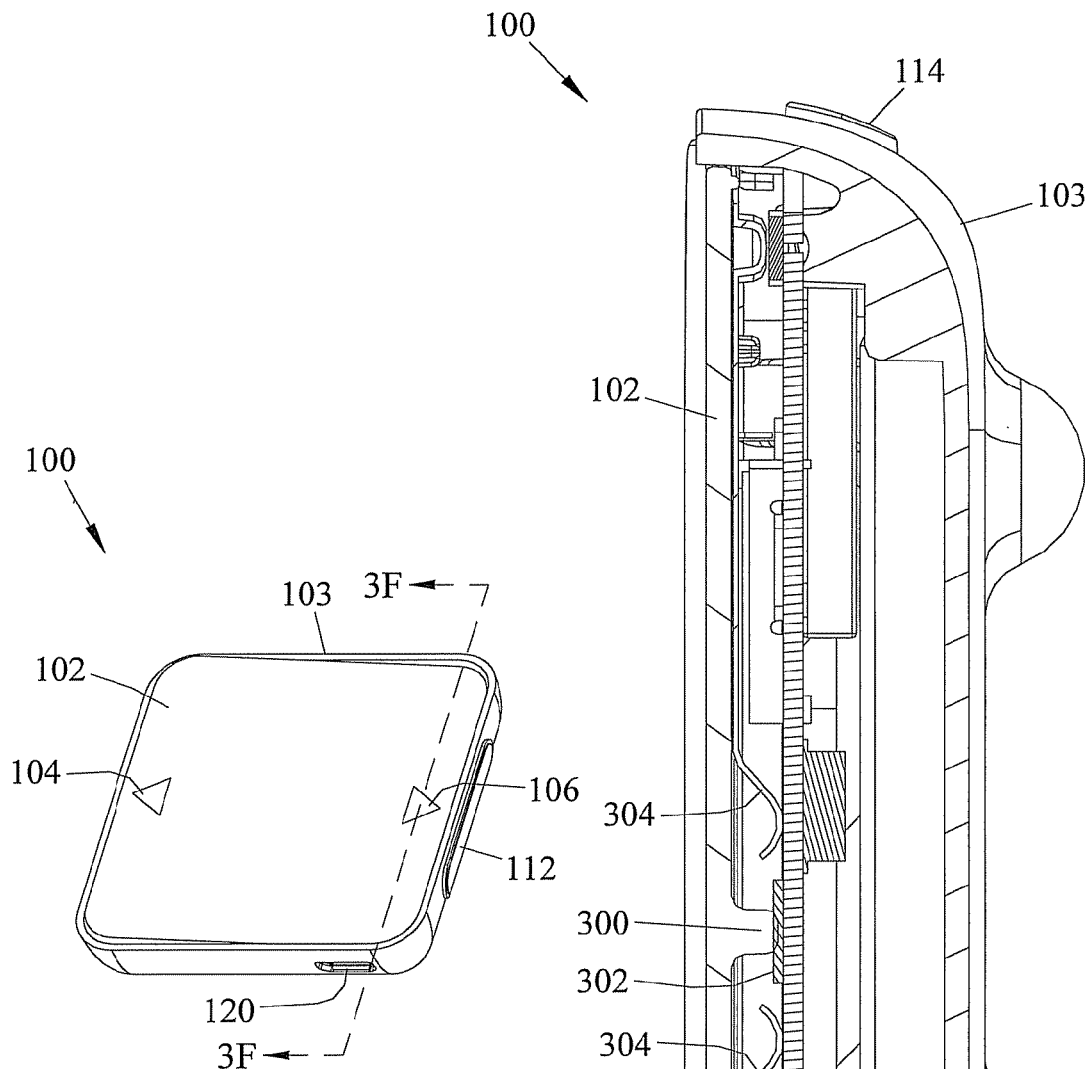
FIG. 3E is a perspective view and FIG. 3F is a sectional view from line 3F-3F illustrated in FIG. 3E of a housing for a portable electronics device according to an embodiment of the subject matter described herein.

FIGS. 3E and 3F respectively illustrate a perspective and a vertical sectional view of housing member 103 and lens 102 when lens 102 is pivoted by applying pressure to the side of lens 102 corresponding to right side button indicator 106. As stated above, when pressure is applied to the side of lens 102 corresponding to right side button indicator 106, lens 102 pivots in a direction that is pivotally opposite the direction that lens 102 pivots when pressure is applied to the side of lens 102 corresponding to the left side button indicator 104. In FIG. 3F, protrusion 300 contacts switch 302 to control a function of a portable electronics device, such as the radio function described above. Biasing members 304 bias lens 102 towards the rest position and facilitate its return to the rest position when the user releases pressure on lens 102.

As illustrated in FIGS. 2A-3F, lens 102 defines a face of housing 100 bounded by sidewalls of housing member 103, and the entirety of the face defined by the lens pivots inward towards housing member 103 on the sides of lens 102 corresponding to left and right side button indicators 104 and 106. Because the entire face pivots, the desired device function can be activated without requiring the amount of manual dexterity required to active a sensor pad. In addition, the pivoting of the face, for example, to change radio channels, is much more user friendly that requiring the user to navigate nested menus to perform this function.

FIGS. 4A-4F illustrate exemplary components of a housing for a portable electronics device and components of the portable electronics device that may be enclosed by the housing according to an embodiment of the subject matter described herein. Referring to FIG. 4A, a coupling member 400 may comprise a metal bracket with a central aperture to allow viewing of a display 402. Coupling member 400 facilitates coupling of lens 102 to housing member 103. Coupling member 400 also facilitates pivoting of lens 102. To facilitate such pivoting, coupling member 400 may be pivotally coupled to housing member 103 via a protrusion 404 and a socket 406 that surrounds protrusion 404 to form a pivot joint. The interaction between socket 406 and protrusion 404 is illustrated in FIGS. 4B and 4C. As illustrated in FIGS. 4B and 4C, housing 103 forms protrusion 404 that extends through socket 406 and coupling member 400 pivots about protrusion 404.

A screw joint 408 may be used to attach coupling member 400 to housing member 103. A screw or other suitable fastener may be inserted in screw joint 408 and into a corresponding bore in housing member 103 for this purpose.

In order to prevent separation of lens 102 from housing member 103 when lens is pivoted, coupling member 400 may include hooks 206 that contact protrusions 208 from housing member 103 to prevent such separation. Hooks 206 and protrusions 208 are illustrated in FIGS. 4D and 4E. As illustrated best in FIG. 4E, a hook 206 that is part of coupling member 400 prevents coupling member 400 from being separated from housing member 103 by contacting protrusion 208 when lens 102 pivots inward on the side opposite hooks 206 and protrusions 208 that come into contact with each other.

As stated above, coupling member 400 attaches to lens 102 and facilitates the pivoting of lens 102. Exemplary details of the attachment of lens 102 to coupling member 400 are illustrated in FIGS. 5A-5I. In FIG. 5A, it can be seen that the front surface of lens 102 is smooth and hides attachment details. In FIG. 5B, lens 102 is attached to coupling member 400 by inserting alignment posts 500 through corresponding holes in coupling member 400. Coupling member 400 may include stops 502 that limit the range of inward pivoting of lens 102 through contact with housing member 103. As stated above, socket 406 forms part of a pivot joint, as illustrated in FIGS.

5B-5F, for allowing lens 102 to pivot. Coupling member 400 may include slots 506, as illustrated best in FIG. 5I, that allow coupling member 400 to flex when lens 102 is pivoted.

As illustrated in FIG. 5B, protrusions 200 and 300 are formed on a lower surface of lens 102 to activate portable electronics device functions when lens 102 is pivoted. Biasing members 204 and 304 facilitate return of lens 102 to the rest position after the user releases pressure on lens 102.

According to another aspect of the subject matter described herein, a housing and clip assembly for a portable electronics device is provided. For example, housing 100 may include a clip that facilitates attachment to a desired article during display or use. The desired article may be a user's clothing or a display for display in a retail sales environment. As described above in the Background, clips for portable electronics devices are spring biased against the housing. Such spring biasing requires a spring assembly. One conventional spring assembly is located entirely outside of the main body of the housing and thus causes the housing to extend or protrude substantially outward from the article to which it is attached increasing the likelihood of loss or damage.

According to a feature of the present subject matter, the coil spring assembly that biases the clip towards the main body of the housing is located at least partially within the main body of the housing, which decreases the total profile of the housing and clip assembly when it is attached to a desired article during use. FIGS. 6A-6G illustrate exemplary details of a housing and clip assembly for a portable electronics device according to an embodiment of the subject matter described herein. Referring to FIG. 6A, a rear view of a housing and clip assembly for a portable electronics device is shown. In FIG. 6A, the housing and clip assembly includes a clip member 600 for attaching to a desired article during use. Clip member 600 is attached to housing member 103 through an attachment that is internal to housing member 103. FIGS. 6B-6G illustrate details of this attachment. More particularly, a spring assembly 601 that is part of clip member 600 protrudes into housing member 103 between guide members 602 and 604. A pivot shaft 606 is inserted axially into spring assembly 601 to couple clip member 600 to housing member 103. An aperture 608 formed in protrusion 124 of housing member 103 between guide members 602 and 604 allows insertion of spring assembly 601 into main body 122 of housing 103.

Figure 6G:
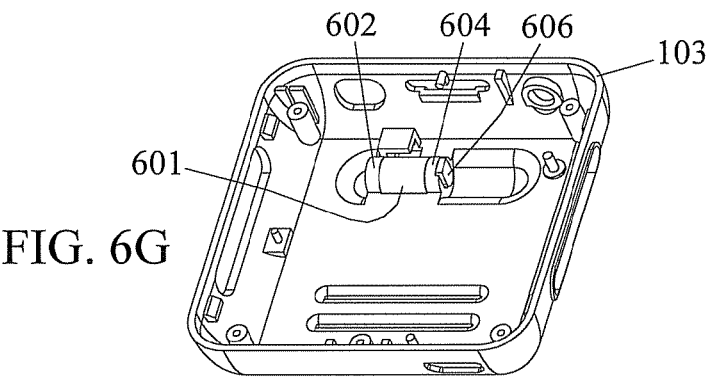
FIG. 6G is a front perspective view of a housing member and portions of a clip assembly for attaching a clip member to the housing member of a portable electronics device according to an embodiment of the subject matter described herein.
Figure 6C:
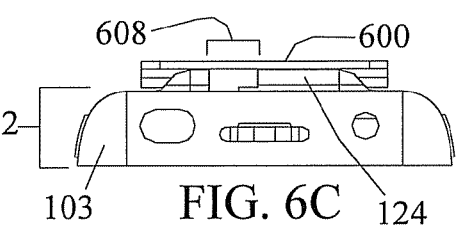
FIGS. 6B-6F illustrate front, top, bottom, and side views of a housing and clip assembly for a portable electronics device according to an embodiment of the subject matter described herein.
Figure 6E:
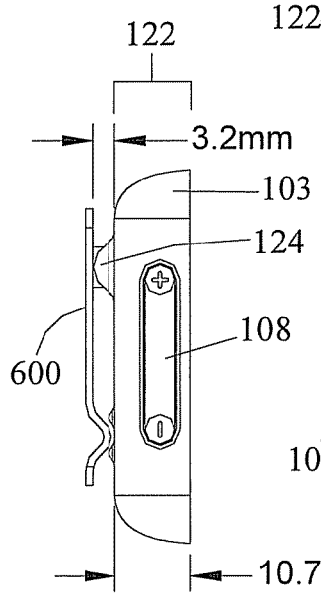
Figure 6B:
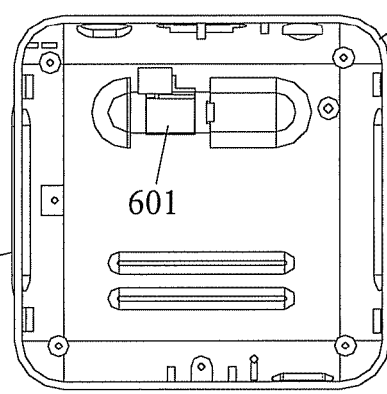
Figure 6F:
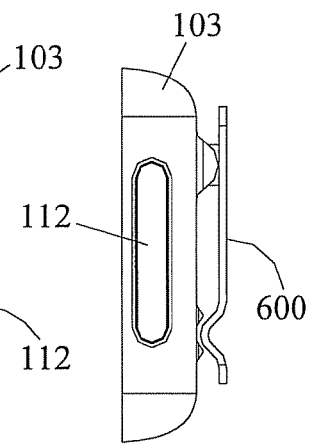
Figure 6D:
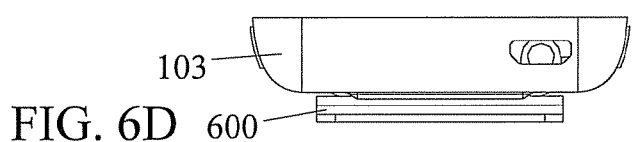
Figure 6A:
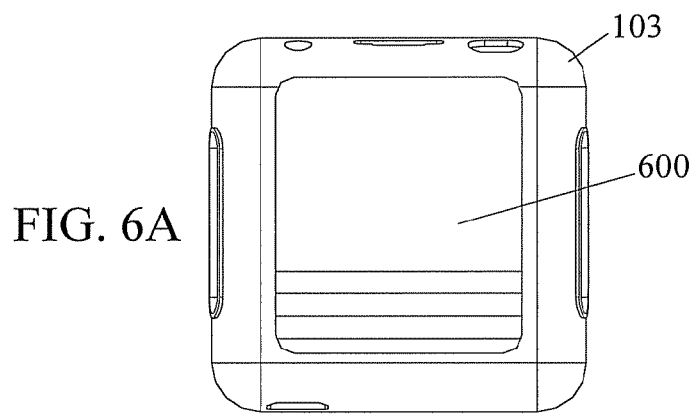
FIG. 6A is a rear view of a housing and a clip member for a portable electronics device according to an embodiment of the subject matter described herein.

As illustrated in FIG. 6E, the result of spring assembly 601 extending within main body 122 of housing member 103 is that the relative thickness of protrusion 124 to that of main body 122 is reduced over conventional clip assemblies for portable electronics devices. In the example illustrated in FIG. 6E, protrusion 124 has a thickness of about 3.2 millimeters and housing member 103 has a thickness of about 10.7 millimeters, making protrusion 124 about one third of the thickness of main body 122. In some conventional portable electronics devices, the protrusion for the coil spring assembly is substantially equal in thickness to the main body of the housing.

Figure 7H:
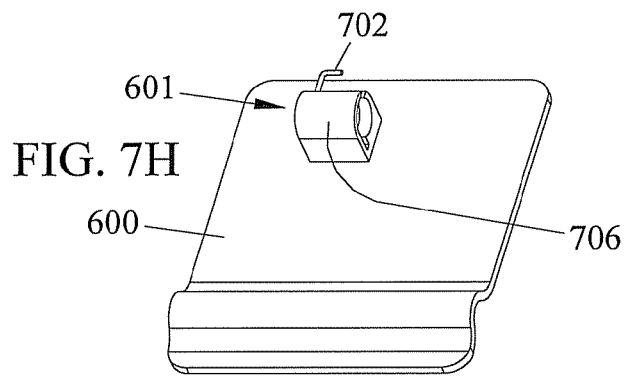
FIG. 7H is a front perspective view of clip assembly for a portable electronics device according to an embodiment of the subject matter described herein.
Figure 7E:
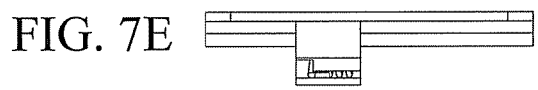
FIGS. 7B-7F illustrate rear, top, bottom, and side views of a clip assembly for a portable electronics device according to an embodiment of the subject matter described herein.
Figure 7B:
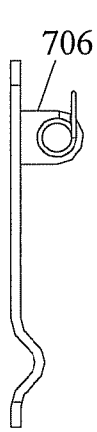
Figure 7A:
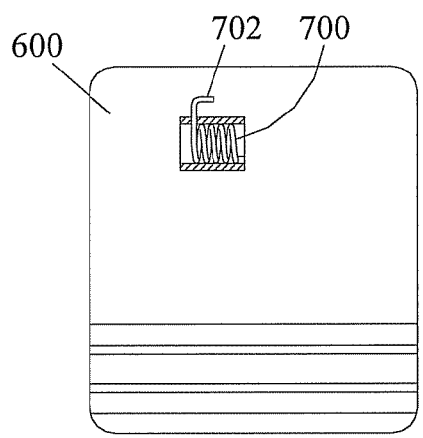
FIG. 7A is a rear perspective view of a clip assembly for a portable electronics device according to an embodiment of the subject matter described herein.
Figure 7C:
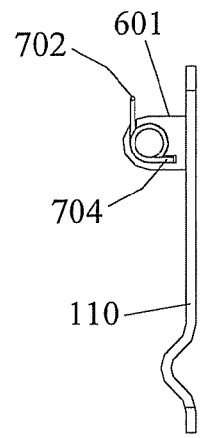
Figure 7D:
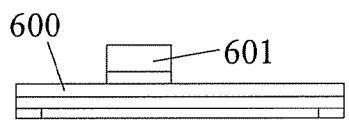
Figure 7F:
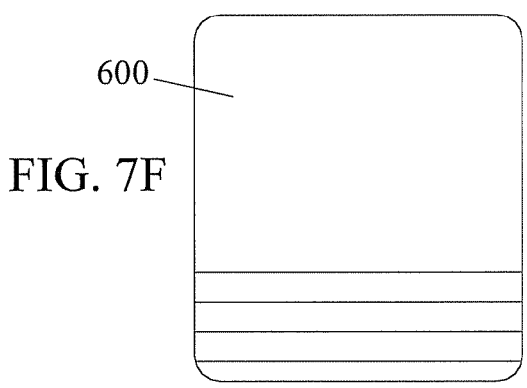
Figure 7G:
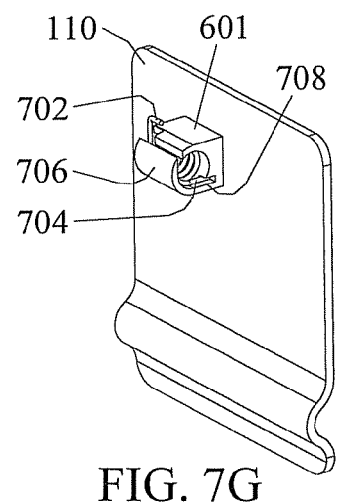
FIG. 7G is a right side perspective view of a clip assembly for a portable electronics device according to an embodiment of the subject matter described herein.

FIGS. 7A-7H illustrate additional details of clip member 600 and coil spring assembly 601. In FIG. 7A, it can be seen that clip member 600 includes a coil spring 700 with first and second ends 702 and 704 for biasing clip member 600 with respect to housing member 103. A clip body portion 706 houses coil spring 700. A clip body recess 708 holds end 704 of spring 700 in place for spring biasing.

Figure 8D:
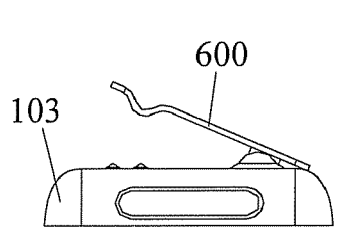
FIGS. 8A-8F illustrate front, top, bottom, and side views of a housing and clip assembly for a portable electronics device where the clip is shown in an open position according to an embodiment of the subject matter described herein.
Figure 8C:
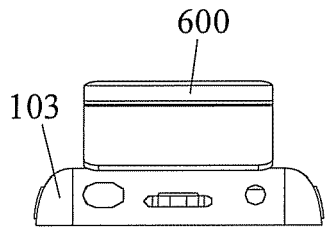
Figure 8E:
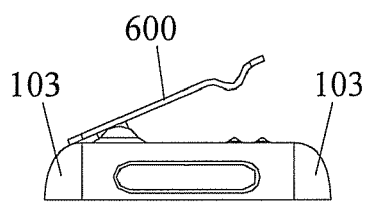
Figure 8F:
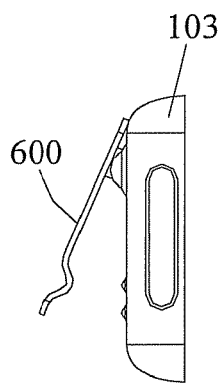
Figure 8A:
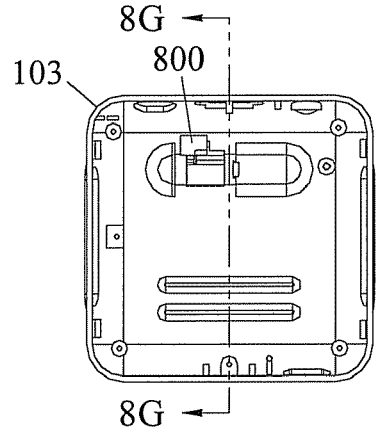
Figure 8G:
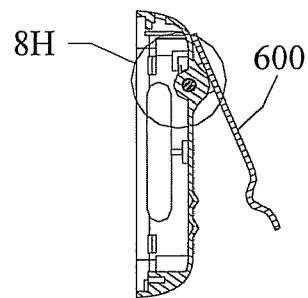
FIG. 8G is a sectional view of a housing and clip assembly for a portable electronics device from section line 8G-8G illustrated in FIG. 8A, where the clip member is shown in the open position according to an embodiment of the subject matter described herein.
Figure 8B:
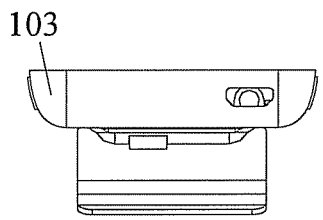
Figure 8I:
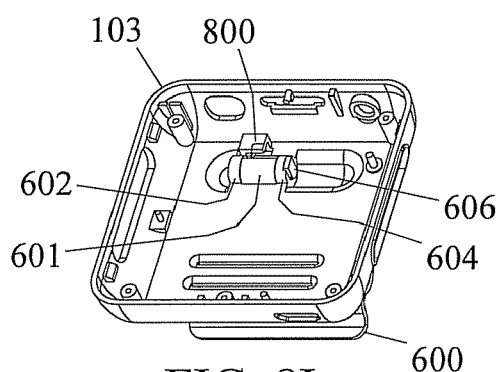
FIG. 8I is a front perspective view of a housing and clip assembly for a portable electronics device according to an embodiment of the subject matter described herein.
Figure 8H:
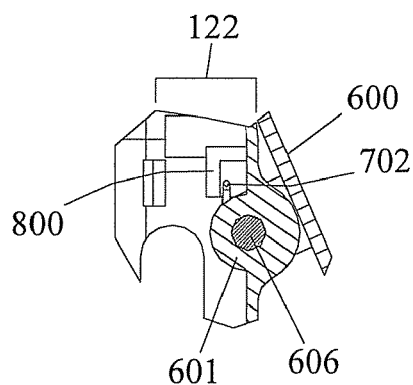
FIG. 8H is a magnified view of a portion of the housing and clip assembly shown in FIG. 8G according to an embodiment of the subject matter described herein.

FIGS. 8A-8I illustrate the relative positions of the components of the housing and clip assembly when clip member 600 is in the open position. As illustrated in FIGS. 8A-8G, clip member 600 pivots angularly outward from housing member 103 when a user applies pressure to an end of clip member 600 closest to a top portion of housing 103. As illustrated in FIG. 8H, clip member 600 pivots about pivot shaft 606, and coil spring end 702 contacts a biasing member 800 of housing member 103 to bias clip member 600 towards the closed position. As illustrated in FIG. 8H, a portion of coil spring assembly 601 substantially equal to a radius of coil spring assembly 601 extends within main body 122 of housing 100. Coil spring biasing member 800 is illustrated in perspective view in FIG. 8I and is shown to be part of housing member 103.

FIGS. 9A-9I illustrate the relative positions of components of the housing and clip assembly when clip member 600 is in the closed position. As illustrated in FIGS. 9A-9F, in the closed position, clip member 600 is substantially parallel to the rear surface of housing member 103. The remaining features in FIGS. 9A-9I are the same as those illustrated in FIGS. 8A-8I, and hence, a description thereof will not be repeated.

Figure 10E:
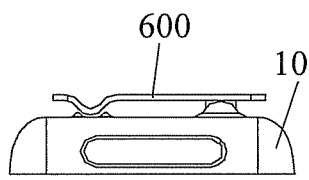
FIGS. 10A-10F illustrate front, top, bottom, and side views of a housing and clip assembly for a portable electronics device according to an embodiment of the subject matter described herein.
Figure 10C:
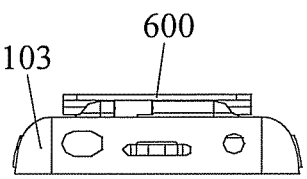
Figure 10F:
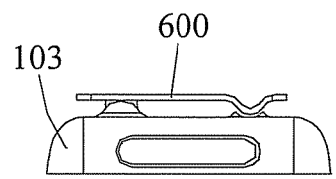
Figure 10D:
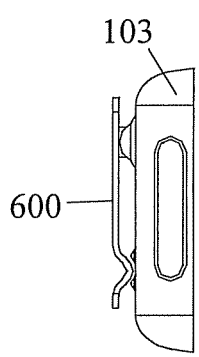
Figure 10A:
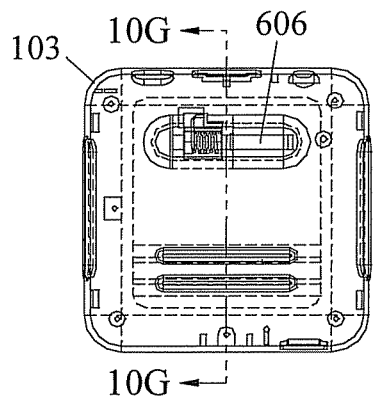
Figure 10G:
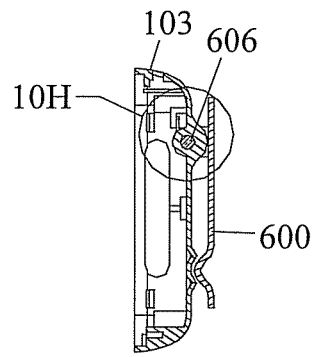
FIG. 10G is a sectional view through line 10G-10G illustrated in FIG. 10A of a housing and clip assembly for a portable electronics device according to an embodiment of the subject matter described herein.
Figure 10B:
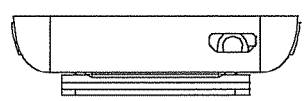
Figure 10H:
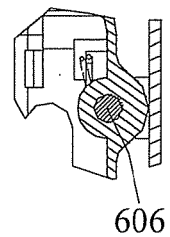
FIG. 10H is a magnified view of a portion of the housing and clip assembly illustrated in FIG. 10G according to an embodiment of the subject matter described herein.
Figure 10J:
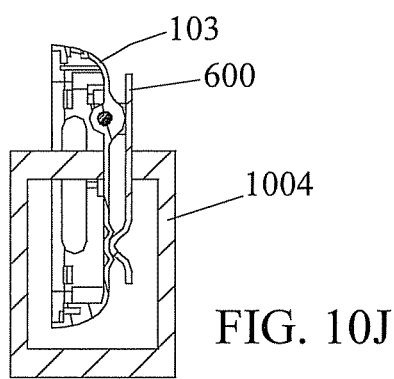
FIG. 10J is a sectional side view of a housing and clip assembly and a fixture for manufacturing the housing and clip assembly according to an embodiment of the subject matter described herein.
Figure 10I:
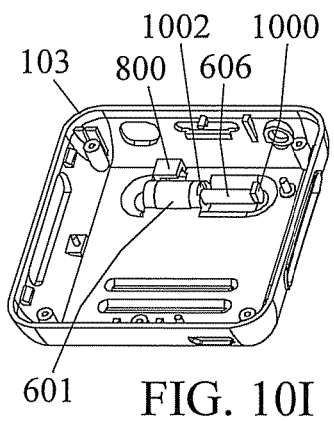
FIG. 10I is a front perspective view of the housing and clip assembly for a portable electronics device according to an embodiment of the subject matter described herein.

FIGS. 10A-10I illustrate exemplary details of assembly of the housing and clip assembly during manufacturing. More particularly, as illustrated in FIGS. 10A-10I, when spring assembly 601 is inserted within the aperture of housing member 103, pivot shaft 606 is inserted axially into spring assembly 601. A radial extension 1000 formed on pivot shaft 606 fits into a recess 1002 of housing member 103 to radially secure pivot shaft 606. As illustrated in FIG. 10J, a fixture 1004 may be used to hold tension on the coil spring while pivot shaft 606 is being inserted into spring assembly 601. The coil spring will maintain tension in the closed position to bias spring members 606 against housing member 103.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A housing for a media player with an integrated radio, the housing comprising:
  a housing member for holding components of the media player with the integrated radio, the components including a display; and
  a lens coupled to the housing member for allowing viewing of the display, the lens having a first position at rest and pivoting independently from the display to a second position for tuning the radio of the media player to a desired frequency.

2. The housing of claim 1 wherein the housing member comprises a unitary member forming five faces of substantially rectangular parallelepiped and wherein the lens comprises a unitary member that forms a sixth face of the substantially rectangular parallelepiped.

3. The housing of claim 1 wherein the lens pivots from the first position to a third position for tuning the radio of the media player.

4. The housing of claim 3 wherein the third position is pivotally opposite the second position.

5. The housing of claim 3 wherein the lens pivots from a range of about zero degrees to about one degree from the first position to the second position and from about zero degrees to about one degree from the first position to the third position.

6. The housing of claim 1 wherein the lens includes protrusions extending towards the housing member for activating switches in the housing member to tune the radio of the media player.

7. The housing of claim 6 comprising a coupling member for coupling the lens to the housing member, the coupling member including biasing members adjacent to the protrusions for biasing the lens to return to the first position from the second position.

8. The housing of claim 7 wherein the coupling member and the housing member form a pivot joint for allowing the lens to pivot from the first position to the second position.

9. The housing of claim 7 wherein the coupling member includes at least one slot for increasing flexibility of the coupling member in a direction of the pivoting of the lens.

10. The housing of claim 1 wherein the lens comprises a photonic crystal material.

11. The housing of claim 1 wherein the lens defines a face of the housing bounded by sidewalls of the housing member and wherein the entirety of the face defined by the lens pivots from the first position to the second position.

12. A housing for a media player with an integrated radio, the housing comprising:
 a housing member for holding components of the media player with the integrated radio, the components including a display, the housing member comprising a unitary member that defines five faces of a substantially rectangular parallelepiped; and
 a lens coupled to the housing member for allowing viewing of the display, the lens comprising a unitary member defining a sixth face of the substantially rectangular parallelepiped, wherein the lens has a first position at rest and pivots independently from the display towards the housing member to a second position and to a third position pivotally opposite the second position for tuning the radio of the media player to a desired frequency.

* * * * *